United States Patent
Zhang et al.

(10) Patent No.: US 12,400,416 B2
(45) Date of Patent: Aug. 26, 2025

(54) CONTROLLING VIRTUAL OBJECT INTERACTIONS

(71) Applicant: Lenovo (Beijing) Limited, Beijing (CN)

(72) Inventors: Guannan Zhang, Beijing (CN); Wanwan Zhao, Beijing (CN)

(73) Assignee: LENOVO (BEIJING) LIMITED, Beijing (CN)

( * ) Notice: Subject to any disclaimer, the term of this patent is extended or adjusted under 35 U.S.C. 154(b) by 163 days.

(21) Appl. No.: 18/183,552

(22) Filed: Mar. 14, 2023

(65) Prior Publication Data

US 2023/0419630 A1    Dec. 28, 2023

(30) Foreign Application Priority Data

Jun. 23, 2022   (CN) .......................... 202210724791.7

(51) Int. Cl.
| | |
|---|---|
| *G06T 19/20* | (2011.01) |
| *G06T 7/70* | (2017.01) |
| *G06V 10/44* | (2022.01) |
| *G06V 10/74* | (2022.01) |

(52) U.S. Cl.
CPC ................ *G06T 19/20* (2013.01); *G06T 7/70* (2017.01); *G06V 10/44* (2022.01); *G06V 10/761* (2022.01); *G06T 2219/2004* (2013.01)

(58) Field of Classification Search
CPC ... G06T 19/20; G06T 7/70; G06T 2219/2004; G06T 13/40; G06V 10/44; G06V 10/761; G06V 40/161; A63F 13/55; A63F 13/56; A63F 13/52; A63F 13/211; A63F 13/212; A63F 13/25; A63F 13/428; A63F 13/5255; A63F 13/75; A63F 13/847
See application file for complete search history.

(56) References Cited

U.S. PATENT DOCUMENTS

| | | | |
|---|---|---|---|
| 2020/0030699 A1* | 1/2020 | Wilson | A63F 13/428 |
| 2023/0256338 A1* | 8/2023 | Cai | A63F 13/537 463/32 |
| 2023/0256341 A1* | 8/2023 | Cai | G06V 10/761 |
| 2024/0037885 A1* | 2/2024 | Wang | G06F 3/04815 |
| 2024/0082728 A1* | 3/2024 | Zhao | A63F 13/537 |
| 2024/0149162 A1* | 5/2024 | Lei | A63F 13/56 |
| 2024/0165514 A1* | 5/2024 | Kitano | G06F 3/016 |
| 2024/0238674 A1* | 7/2024 | Matsunaga | A63F 13/55 |

\* cited by examiner

*Primary Examiner* — Jin Cheng Wang
(74) *Attorney, Agent, or Firm* — ANOVA LAW GROUP, PLLC (57) ABSTRACT

An information processing method includes: displaying a first screen of an application program, the first screen being an image of observing a first virtual object in a virtual environment though an image acquisition model; in response to an operation of initiating an interactive action of the first virtual object, controlling the first virtual object to initiate the interactive action, and determining a second virtual object in the virtual environment whose feature satisfies a feature locking condition; and controlling the first virtual object to perform the interactive action with the second virtual object, and displaying a second screen of the application program, the second screen being an image of observing the interactive action between the first virtual object and the second virtual object through the image acquisition model.

20 Claims, 6 Drawing Sheets

CONTROLLING VIRTUAL OBJECT INTERACTIONS

CROSS-REFERENCE TO RELATED APPLICATION

This application claims priority to Chinese Patent Application No. 202210724791.7, filed on Jun. 23, 2022, the entire content of which is incorporated herein by reference.

TECHNICAL FIELD

The present disclosure relates to the technical field of digital image processing and, more particularly, to an information processing method, an information processing apparatus, and an electronic device.

BACKGROUND

As science and technology advances, virtual world has entered people's life. In a virtual world scene, virtual objects can not only perform one-way triggered actions, such as dancing, and waving, etc., but also perform two-way action interactions with other virtual objects, such as shaking hands, holding hands, and hugging. However, when interacting with another virtual object, a virtual object and the other virtual object need to be at a specified location, and after the virtual object sends out an action invitation, the two virtual objects can interact with each other only after the other virtual object agrees to the action invitation. Currently, the interaction method lacks variety and sophistication.

SUMMARY

One aspect of the present disclosure provides an information processing method. The information processing method includes: displaying a first screen of an application program, the first screen being an image of observing a first virtual object in a virtual environment though an image acquisition model; in response to an operation of initiating an interactive action of the first virtual object, controlling the first virtual object to initiate the interactive action, and determining a second virtual object in the virtual environment whose feature satisfies a feature locking condition; and controlling the first virtual object to perform the interactive action with the second virtual object, and displaying a second screen of the application program, the second screen being an image of observing the interactive action between the first virtual object and the second virtual object through the image acquisition model.

Another aspect of the present disclosure provides an information processing apparatus. The information processing apparatus includes a memory storing program instructions and a processor coupled to the memory. When being executed by the processor, the program instructions cause the processor to: display a first screen of an application program, the first screen being an image of observing a first virtual object in a virtual environment though an image acquisition model; in response to an operation of initiating an interactive action of the first virtual object, control the first virtual object to initiate the interactive action, and determining a second virtual object in the virtual environment whose feature satisfies a feature locking condition; and control the first virtual object to perform the interactive action with the second virtual object, and displaying a second screen of the application program, the second screen being an image of observing the interactive action between the first virtual object and the second virtual object through the image acquisition model.

Another aspect of the present disclosure provides a computer-readable storage medium. When being executed by the processor, the program instructions cause the processor to: display a first screen of an application program, the first screen being an image of observing a first virtual object in a virtual environment though an image acquisition model; in response to an operation of initiating an interactive action of the first virtual object, control the first virtual object to initiate the interactive action, and determining a second virtual object in the virtual environment whose feature satisfies a feature locking condition; and control the first virtual object to perform the interactive action with the second virtual object, and displaying a second screen of the application program, the second screen being an image of observing the interactive action between the first virtual object and the second virtual object through the image acquisition model.

BRIEF DESCRIPTION OF THE DRAWINGS

To more clearly illustrate the technical solution of the present disclosure, the accompanying drawings used in the description of the disclosed embodiments are briefly described below. The drawings described below are merely some embodiments of the present disclosure. Other drawings may be derived from such drawings by a person with ordinary skill in the art without creative efforts and may be encompassed in the present disclosure.

DETAILED DESCRIPTION OF THE EMBODIMENTS

In order to make the objectives, technical solutions, and advantages of the present disclosure clearer, the present disclosure will be further described in detail below with reference to the accompanying drawings. Obviously, the described embodiments are only some of the embodiments of the present disclosure, not all of the embodiments. Based on the embodiments of the present disclosure, all other embodiments obtained by those of ordinary skill in the art without creative efforts shall fall within the scope of the present disclosure.

The terms "first", "second" and the like in the specification and claims of the present disclosure and the above drawings are used to distinguish different objects, rather than to describe a specific order. Further, the terms "include" and "have", as well as any variations thereof, are intended to cover a non-exclusive inclusion. For example, a process, method, system, product, or device comprising a series of steps or units is not limited to the listed steps or units, but optionally also includes unlisted steps or units, or optionally further includes other steps or units inherent in these processes, methods, products, or devices.

Reference herein to an "embodiment" means that a particular feature, structure, or characteristic described in connection with the embodiment can be included in at least one embodiment of the present disclosure. The occurrences of the phrase in various places in the specification are not necessarily all referring to the same embodiment, nor are separate or alternative embodiments mutually exclusive of other embodiments. It is understood explicitly and implicitly by those skilled in the art that the embodiments described herein can be combined with other embodiments.

Figure 1:
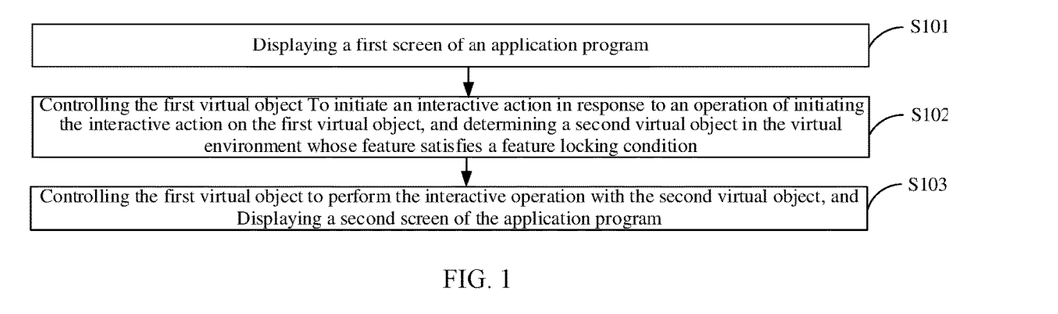
FIG. 1 is a flowchart of an exemplary information processing method according to some embodiments of the present disclosure.

The present disclosure provides an information processing method. The information processing method is applied to an electronic device. FIG. 1 is a flowchart of an exemplary information processing method according to some embodiments of the present disclosure. As shown in FIG. 1, the information processing method includes the following processes.

At S101, a first screen of an application program is displayed.

The first screen includes an image of a first virtual object being observed through an image acquisition model in a virtual environment.

In some embodiments, the application program is an application program supporting the virtual environment, and the virtual environment includes virtual objects. In some other embodiments, the application program is an application program supporting a three-dimensional (3D) virtual environment. The application program may be any one of a military simulation application program, a shooting application program, a virtual reality (VR) application program, or an augmented reality (AR) application program. In some other embodiments, the application program may also be an off-line version of the application program (i.e., running on a single computer), such as a stand-alone version of a 3D game program. The application program may also be an online version of the application program, which is not specifically limited in the present disclosure.

In some embodiments, the virtual environment is a virtual environment displayed (or provided) when an application program runs on an electronic device. The virtual environment may be a simulated environment of the real world. The virtual environment may also be a partly simulated and partly fictional 3D environment. The virtual environment may also be a purely fictional 3D environment. The virtual environment includes but is not limited to high-dimensional virtual environments such as the 3D virtual environment and four-dimensional (4D) virtual environment. In the embodiments of the present disclosure, the virtual environment is the 3D virtual environment as an example, but it is not limited thereto.

In some embodiments, the virtual object refers to a movable object in the virtual environment, and the movable object may be at least one of a virtual character, a virtual animation, or an animation character. In some other embodiments, when the virtual environment is a 3D virtual environment, the virtual object is a 3D model created based on an animation skeleton technology. Each virtual object has its own shape and volume in the 3D virtual environment, and occupies a space in the 3D virtual environment.

In some embodiments, a viewing angle refers to an observation angle when the virtual object in the virtual environment is observed from a first-person perspective or a third-person perspective. In some other embodiments, the viewing angle is an angle at which the virtual object is observed through an image acquisition model such as a camera model in the virtual environment.

In some embodiments, the image acquisition model automatically follows the virtual object in the virtual environment, that is, when a position of the virtual object in the virtual environment changes, the image acquisition model moves simultaneously to follow the position of the virtual object in the virtual environment. The image acquisition model is always within a preset distance range of the virtual object in the virtual environment. In some other embodiments, during an automatic following process, relative positions of the image acquisition model and the virtual object do not change.

In some embodiments, the image acquisition model follows the virtual object in the virtual environment by rotating the viewing angle and/or adjusting a focus on the virtual object. That is, when the position of the virtual object changes in the virtual environment, the position of the image acquisition model does not change, but the image acquisition model follows the virtual object by adjusting its own rotation angle and/or focal length. In some embodiments, during the automatic following process, the relative positions of the image acquisition model and the virtual object change.

In some embodiments, the image acquisition model is a 3D model located around the virtual object in the 3D virtual environment. When the first-person perspective is adopted, the image acquisition model is located near or on a head of the virtual object. When the third-person perspective is adopted, the image acquisition model may be located behind the virtual object and bound to the virtual object, or may be located at any position with a preset distance from the virtual object, through which the virtual object in the virtual environment is observed by the image acquisition model in three dimensions from different angles. In some embodiments, when the third-person perspective is a first-person over-theshoulder perspective, the image acquisition model is located behind the virtual object (such as the head and shoulders of the virtual character). In some embodiments, in addition to the first-person perspective and the third-person perspective, other perspectives such as a top-down perspective may be adopted. When the top-down perspective is adopted, the image acquisition model may be located above the head of the virtual object, and the top-down perspective is the viewing angle looking down to observe the virtual environment. In some embodiments, the image acquisition model may not be actually displayed in the 3D virtual environment. That is, the image acquisition model may not be displayed in the 3D virtual environment displayed on a user interface.

In practical applications, the electronic device may be a mobile terminal device such as a mobile phone, a tablet computer, a notebook computer, a personal digital assistant (PDA), a camera, a wearable device, a smart bracelet, a smart watch, a car equipment, an e-book reader, and a game console. The electronic device may also be a fixed terminal device such as a desktop computer.

In some embodiments, the first screen of the application program is displayed on the electronic device. In some embodiments, the first screen may be a screen of the virtual environment in which the first virtual object is observed from a first viewing angle in the virtual environment. The first viewing angle may be at least one of a first-person viewing angle, a third-person viewing angle, or another viewing angle. In this case, the another viewing angle may be a top-down viewing angle or any other possible viewing angle.

At S102, the first virtual object is controlled to initiate an interactive action in response to an operation of initiating the interactive action on the first virtual object, and a second virtual object is determined in the virtual environment whose feature satisfies a feature locking condition.

In some embodiments, the first virtual object is a virtual object controlled by the electronic device, and the electronic device initiates a user operation according to the received first virtual object, thereby controlling the first virtual object to initiate the interactive action. For example, the interaction action initiated by the first virtual object includes but is not limited to dancing, waving, shaking hands, holding hands, and hugging.

In some embodiments, the feature of the virtual object includes but is not limited to: the interactive action initiated by the virtual object, the position of the virtual object, a face orientation of the virtual object, and a time when the virtual object initiated the interactive action.

In some embodiments, the feature locking condition is a condition for automatically interlocking the first virtual object with another virtual object.

In some embodiments, the electronic device responds to the user operation of initiating the interactive action on the first virtual object, controls the first virtual object to initiate the interactive action, and determines in the virtual environment the second virtual object whose feature satisfies the feature locking condition. It should be noted that the first screen may include the second virtual object, or may not include the second virtual object, but the virtual environment must include the second virtual object.

In some embodiments, the feature of a virtual object satisfying the feature locking condition includes: a similarity between the interactive action initiated by the virtual object in the virtual environment and the interactive action initiated by the first virtual object is greater than a similarity threshold.

In some embodiments, the similarity threshold is used to determine whether the interactive action initiated by the virtual object is consistent with the interactive action initiated by the first virtual object. For example, the similarity threshold may be 80%.

In some embodiments, the electronic device responds to the user operation of initiating the interactive action on the first virtual object, controls the first virtual object to initiate the interactive action, and determines the interactive action initiated by another virtual object different from the first virtual object in the virtual environment. If the similarity between the interactive action initiated by another virtual object in the virtual environment and the interactive action initiated by the first virtual object is greater than the similarity threshold, it indicates that there is an interactive action consistent with the interactive action initiated by the first virtual object in the virtual environment, and the another virtual object that initiates the consistent interaction action is determined as the second virtual object.

Figure 2:
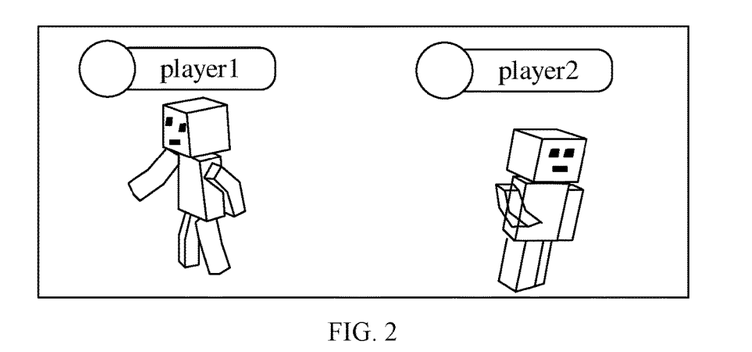
FIG. 2 is a schematic diagram of a first virtual object and a second virtual object initiating an identical interactive action according to some embodiments of the present disclosure.

FIG. 2 is a schematic diagram of a first virtual object and a second virtual object initiating an identical interactive action according to some embodiments of the present disclosure. As shown in FIG. 2, the electronic device displays the first screen of the application program, and the first screen includes a first virtual object player1 and a second virtual object player2. Further, the electronic device responds to the user operation of initiating an interactive action on player1, and controls player1 to initiate an interactive action. Then, the electronic device determines that another virtual object in the virtual environment, such as player2, also initiates an interactive action, and the similarity between the interactive action initiated by player2 and the interactive action initiated by player1 is greater than the similarity threshold. That is, player2 and player1 initiate the identical interactive action, even if player2 and player1 are facing opposite to each other. At this time, the electronic device determines that the features of player2 and player1 in the virtual environment satisfy the feature locking condition, and player2 is determined as the second virtual object. Then, player1 and player2 are automatically locked to perform the interactive action between the first virtual object and the second virtual object.

At S103, the first virtual object is controlled to perform the interactive operation with the second virtual object, and a second screen of the application program is displayed.

The second screen is an image of the interactive action between the first virtual object and the second virtual object observed by the image acquisition model.

Figure 3:
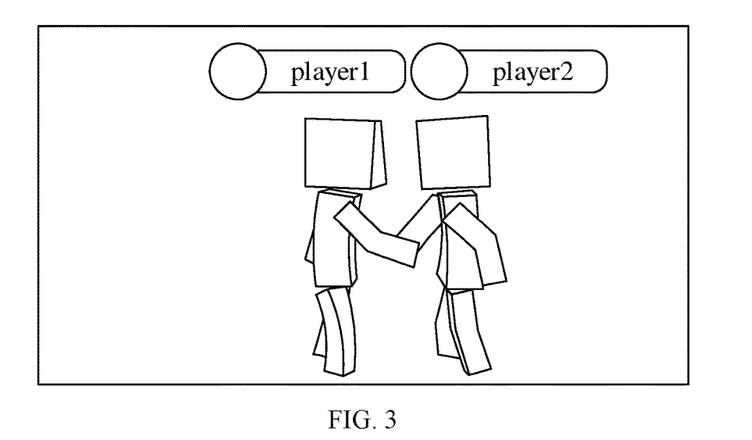
FIG. 3 is a schematic diagram of a second screen showing the interactive action between the first virtual object and the second virtual object according to some embodiments of the present disclosure.

In the embodiments of the present disclosure, the electronic device responds to the user operation of initiating the interactive action on the first virtual object, and controls the first virtual object to initiate the interactive action. After the second virtual object whose feature satisfies the feature locking condition in the virtual environment is determined, the first virtual object is controlled to perform the interactive action with the second virtual object, and the second screen observing the interactive action between the first virtual object and the second virtual object is displayed in the application program. FIG. 3 is a schematic diagram of a second screen showing the interactive action between the first virtual object and the second virtual object according to some embodiments of the present disclosure. After the first virtual object and the second virtual object are automatically locked to perform and complete the interactive action, a locking relationship between the first virtual object and the second virtual object is released. That is, the first virtual object and the second virtual object are unlocked. At this time, when the first virtual object initiates another interactive action, the electronic device locks another virtual object whose feature in the virtual environment satisfies the feature locking condition with the first virtual object, thereby improving the performance of the electronic device.

The information processing method provided by the embodiments of the present disclosure includes: displaying the first screen of the application program, the first screen including the image of the first virtual object observed through the image acquisition model in the virtual environment; in response to the user operation of initiating the interactive action on the first virtual object, controlling the first virtual object to initiate the interactive action, and determining the second virtual object whose feature in the virtual environment satisfies the feature locking condition; controlling the first virtual object to perform the interactive action with the second virtual object, and displaying the second screen of the application program, the second screen showing the interactive action between the first virtual object and the second virtual object observed by the image acquisition model. That is, in the embodiments of the present disclosure, the electronic device determines the second virtual object in the virtual environment whose feature satisfies the feature locking condition at least based on the interactive action initiated by the first virtual object, automatically locks the first virtual object and the second virtual object, controls the first virtual object to perform the interactive action with the second virtual object, and displays the second screen showing the interactive action performed between the first virtual object and the second virtual object. As such, it solves the problem in the following scenario. One virtual object and other virtual object are located at a specified position. After the one virtual object sends out an action invitation, the other virtual object agrees to the action invitation. The two virtual objects interact with each other. The two virtual objects are automatically locked with each other. After the interactive action between the two virtual objects is completed, the two virtual objects are automatically unlocked. Thus, the electronic device become more intelligent, and user experience is improved.

Figure 4:
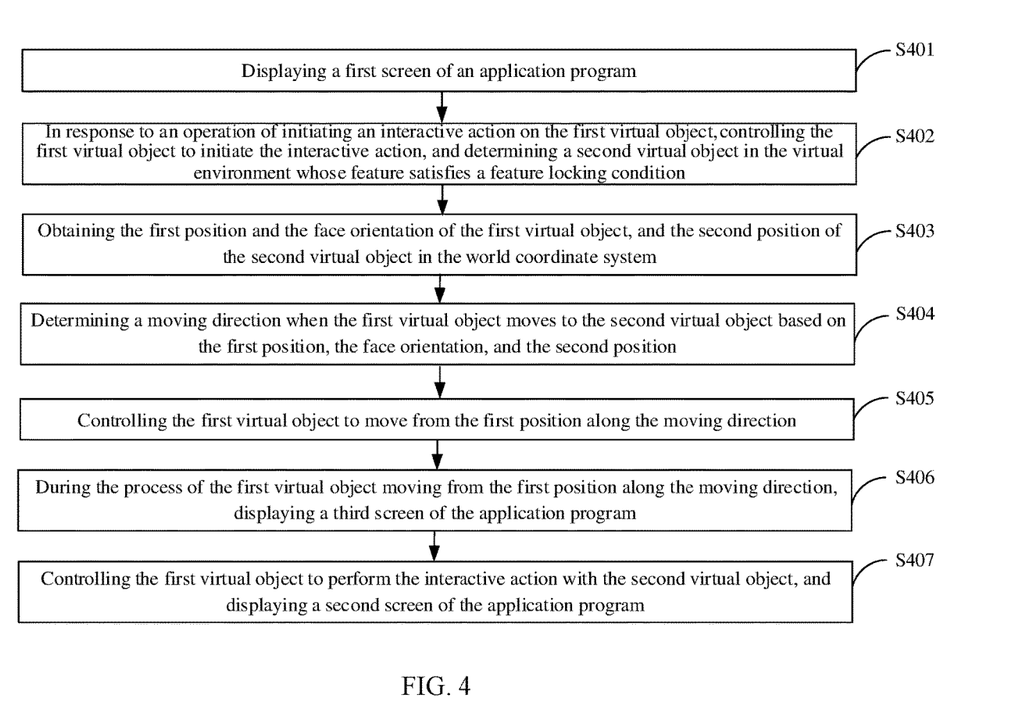
FIG. 4 is a flowchart of another exemplary information processing method according to some embodiments of the present disclosure.

The present disclosure provides an information processing method. The information processing method is applied to an electronic device. FIG. 4 is a flowchart of another exemplary information processing method according to some embodiments of the present disclosure. As shown in FIG. 4, the information processing method includes the following processes.

At S401, a first screen of an application program is displayed.

The first screen includes an image of a first virtual object observed through an image acquisition model in a virtual environment.

At S402: in response to an operation of initiating an interactive action on the first virtual object, the first virtual object is controlled to initiate the interactive action, and a second virtual object in the virtual environment whose feature satisfies a feature locking condition is determined.

In some embodiments, the feature of the virtual object satisfying the feature locking condition includes: a similarity between the interactive action initiated by the virtual object in the virtual environment and the interactive action initiated by the first virtual object is greater than a similarity threshold.

In some embodiments, the feature of the virtual object satisfying the feature locking condition also includes at least one of the following: a distance between the position of the virtual object and the position of the first virtual object is less than a distance threshold; an angle formed between a face orientation of the virtual object and a face orientation of the first virtual object is smaller than a preset angle; or an interval between the virtual object initiating the interactive action and the first virtual object initiating the interactive action is less than an interval threshold.

In some embodiments, the electronic device is pre-configured with the distance threshold, the preset angle, and the interval threshold. In some other embodiments, the distance threshold, the preset angle, and the interval threshold may be default values in the application program or may be configured by a user, which is not specifically limited in the present disclosure.

In some embodiments, the electronic device responds to the operation of initiating the interactive action on the first virtual object, controls the first virtual object to initiate the interactive action, and when it is determined that the similarity between the interactive action initiated by at least one virtual object in the virtual environment and the interactive action initiated by the first virtual object is greater than the similarity threshold, determining that the distance between the position of the at least one virtual object and the position of the first virtual object is less than the distance threshold, and/or determining that the angle formed between the face orientation of the at least one virtual object and the face orientation of the first virtual object is less than the preset angle, and/or determining that the interval between the at least one virtual object initiating the interactive action and the first virtual object initiating the interactive action is less than the interval threshold. As a result, the second virtual object whose feature satisfies the feature locking condition is determined from the at least one virtual object.

In an application scenario, the electronic device controls the first virtual object to initiate the interactive action in response to the operation of initiating the interactive action on the first virtual object, and when it is determined that the similarity between the interactive action initiated by at least one virtual object in the virtual environment and the interactive action initiated by the first virtual object is greater than the similarity threshold, selecting from the at least one virtual object a virtual object that is closest to the first virtual object as the second virtual object, and/or selecting from the at least one virtual object a virtual object whose face orientation forms a smallest angle with the face orientation of the first virtual object, and/or selecting from the at least one virtual object a virtual object that initiates the interactive action in a shortest interval from the first virtual object initiating the interactive action. The present disclosure does not impose any limitation on the selection process as long as the second virtual object can be selected from the at least one virtual object. As such, through configuring multiple selection conditions, the second virtual object whose feature satisfies the feature locking condition can be selected from the at least one virtual object, thereby achieving the automatic locking (i.e., automatic interlocking) between the second virtual object and the first virtual object.

In another application scenario, the electronic device calculates the distance between the position of other virtual object and the position of the first virtual object based on world coordinates. When the distance between the position of the other virtual object and the position of the first virtual object is less than the distance threshold, it is determined that the feature of the other virtual object satisfies the feature locking condition, and the other virtual object is the second virtual object. In this case, calculating the distance between the position of the other virtual object and the position of the first virtual object includes the following processes. The electronic device uses a bounding box algorithm to determine a center point of the other virtual object, and establishes a local coordinate system with the center point of the other virtual object as the origin. The electronic device converts coordinates of the center point of the other virtual object in the local coordinate system into coordinates in the world coordinate system. A first position $A1(x_1, y_1, z_1)$ of the first virtual object and a third position $B1(x_2, y_2, z_2)$ of the other virtual object in the world coordinate system are obtained. Based on the first position and the third position, the distance between the first virtual object and the other virtual object is calculated. The distance between the first virtual object and the other virtual object can be obtained using the following formula (1), $$\text{distance} = \sqrt{(x_1-x_2)^2+(y_1-y_2)^2+(z_1-z_2)^2}. \quad (1)$$

Then, if the distance between the first virtual object and the other virtual object is less than the distance threshold distance_Threshold, the other virtual object is determined as the second virtual object, and the first virtual object and the second virtual object are set to a locked state. As such, the position coordinates of the first virtual object and the other virtual object are determined in the local coordinate system, and the position coordinates of the first virtual object and the other virtual object are converted to the position coordinates in the world coordinate system through a coordinate conversion, such that location information of the first virtual object and the other virtual object in the world coordinates can be more accurately determined.

In some embodiments, after the electronic device determines the second virtual object, the electronic device outputs a first prompt message. The first prompt message is used to prompt the first virtual object that the second virtual object that interacts with the first virtual object has been locked. The first prompt message is also used to remind the first virtual object that the interactive action can be retracted temporarily, and then can be performed again when the first virtual object moves to a certain position to interact with the second virtual object. Thus, the interactive action is more in line with people settings and improves the player's gaming experience.

At S403, the first position and the face orientation of the first virtual object, and the second position of the second virtual object in the world coordinate system are obtained.

In some embodiments, the world coordinate system includes three axes, X axis, Y axis, and Z axis. The X axis represents a left-right space in a 3D space, the Y axis represents an up-down space in the 3D space, and the Z axis represents a front-back space in the 3D space. It should be noted that the X-axis, the Y-axis, and the Z-axis form a 3D space rectangular coordinate system of the world coordinate system.

At S404, a moving direction when the first virtual object moves to the second virtual object is determined based on the first position, the face orientation, and the second position.

At S405, the first virtual object is controlled to move from the first position along the moving direction.

In the embodiments of the present disclosure, the electronic device obtains the first position of the first virtual object and the face orientation of the first virtual object in the world coordinate system, and obtains the second position of the second virtual object in the world coordinate system. The electronic device determines the moving direction when the first virtual object moves toward the second virtual object based on the first position and the second position. It should be noted that if the moving direction of the first virtual object is inconsistent with the face orientation of the first virtual object, the first virtual object will rotate from the current face orientation to a direction consistent with the moving direction. If the moving direction of the first virtual object is consistent with the face orientation of the first virtual object, the first virtual object does not need to rotate, and the current face orientation is determined as the moving direction. Then, the first virtual object is controlled to move from the first position to the second virtual object along the moving direction. It should be noted that when the electronic device controls the first virtual object to move from the first position to the second virtual object along the moving direction, the electronic device may control the first virtual object to keep the initiated interactive action during a moving process. Of course, the electronic device may also control the first virtual object to retract the initiated interaction action when a movement starts, and may re-perform the interaction action when the first virtual object reaches a target position.

In another application scenario, if the moving direction of the first virtual object is inconsistent with the face orientation of the first virtual object, a rotation angle $\alpha$ of the first virtual object is determined based on the moving direction and the face orientation. The face orientation of the first virtual object is rotated based on the rotation angle $\alpha$. It should be noted that in the 3D virtual environment, the rotation of the first virtual object is realized through a rotation matrix as described in detail as follows.

When the first position $A1(x_1, y_1, z_1)$ of the first virtual object and the second position $B1(x_2, y_2, z_2)$ of the second virtual object in the world coordinate system are obtained, a middle position $V(x_0, y_0, z_0)$ between the first virtual object and the second virtual object is calculated. A first unit vector starting from the first position $A1(x_1, y_1, z_1)$ and ending at the middle position $V(x_0, y_0, z_0)$ is obtained. The rotation angle $\alpha$ is calculated based on the first unit vector, and a corresponding rotation matrix is calculated when the first virtual object rotates with different axes in the world coordinate system as the rotation axis, that is, the corresponding rotation matrix $R_x$ when the X-axis in the world coordinate system is used as the rotation axis, the corresponding rotation matrix $R_y$ when the Y-axis in the world coordinate system is used as the rotation axis, and the corresponding rotation matrix $R_z$ when the Z-axis in the world coordinate system is used as the rotation axis. Then, the rotation matrix $R_x$, the rotation matrix $R_y$, and the rotation matrix $R_z$ are multiplied to obtain a target rotation matrix R, that is, $R = R_x \times R_y \times R_z$. The first position $A1(x_1, y_1, z_1)$ and the target rotation matrix R are multiplied to realize the rotation of the first virtual object. The rotation matrix $R_x$, the rotation matrix $R_y$, and the rotation matrix $R_z$ can be obtained through the following formula (2), $$R_x = \begin{vmatrix} 1 & 0 & 0 & 0 \\ 0 & \cos\alpha & -\sin\alpha & 0 \\ 0 & \sin\alpha & \cos\alpha & 0 \\ 0 & 0 & 0 & 1 \end{vmatrix}, R_y = \begin{vmatrix} \cos\alpha & 0 & -\sin\alpha & 0 \\ 0 & 1 & 0 & 0 \\ \sin\alpha & 0 & \cos\alpha & 0 \\ 0 & 0 & 0 & 1 \end{vmatrix}, \quad (2)$$

$$R_z = \begin{vmatrix} \cos\alpha & -\sin\alpha & 0 & 0 \\ \sin\alpha & \cos\alpha & 0 & 0 \\ 0 & 0 & 1 & 0 \\ 0 & 0 & 0 & 1 \end{vmatrix}$$

Figure 5:
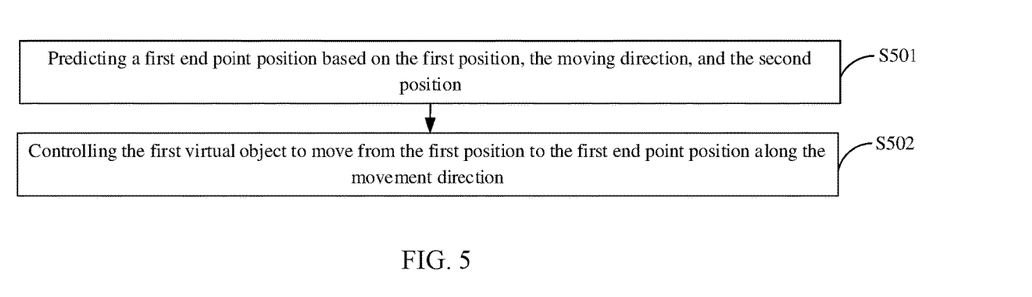
FIG. 5 is a flowchart of another exemplary information processing method according to some embodiments of the present disclosure.

In some embodiments, a process of controlling the first virtual object to move from the first position along the moving direction in S405 is further described with reference to FIG. 5.

At S501, a first end point position is predicted based on the first position, the moving direction, and the second position.

In some embodiments, the first end point position is a position of any point on a line connecting the first position and the second position. For example, the first end point position may be a position of a midpoint on the line connecting the first position and the second position. The first end point position may also be a position of a point on the line connecting the first position and the second position and relatively close to the first position. The first end point position may also be a position of a point on the line connecting the first position and the second position and relatively close to the second position. The present disclosure does not impose any limitations on the specific position of the first end point position.

At S502, the first virtual object is controlled to move from the first position to the first end point position along the movement direction.

In some embodiments, when the electronic device predicts the first end point position based on the first position, the moving direction, and the second position, a target distance that the first virtual object moves from the first position to the first end point position is determined based on based on the first position and the first end position. Further, the electronic device controls the first virtual object to move from the first position along the movement direction to reach the first end point position after moving the target distance.

Figure 6:
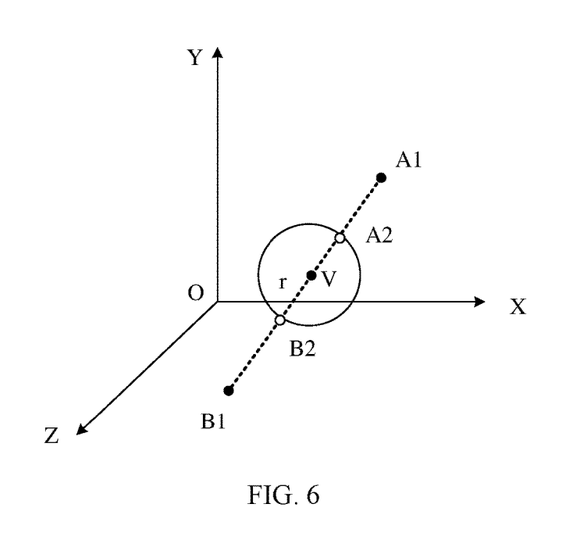
FIG. 6 is a schematic diagram of positions of the first virtual object and the second virtual object when interacting with each other according to some embodiments of the present disclosure.

In another application scenario, when the first virtual object and the second virtual object perform the interactive action, there may still be a certain distance between the first virtual object and the second virtual object. FIG. 6 is a schematic diagram of positions of the first virtual object and the second virtual object when interacting with each other according to some embodiments of the present disclosure. As shown in FIG. 6, the interactive action is performed when the distance between the first virtual object and the second virtual object is d.

When the first position $A1(x_1, y_1, z_1)$ of the first virtual object and the second position $B1(x_2, y_2, z_2)$ of the second virtual object in the world coordinate system are obtained, the middle position $V(x_0, y_0, z_0)$ between the first virtual object and the second virtual object can be calculated by the following formula (3), $$x_0 = \frac{x_1+x_2}{2}, y_0 = \frac{y_1+y_2}{2}, z_0 = \frac{z_1+z_2}{2} \qquad (3)$$

Based on the middle position $V(x_0, y_0, z_0)$, the first position $A1(x_1, y_1, z_1)$, and the second position $B1(x_2, y_2, z_2)$, a first end point position $A2(x_3, y_3, z_3)$ of the first virtual object and a second end point position $B2(x_4, y_4, z_4)$ of the second virtual object are calculated using a 3D algorithm of intersecting a straight line and a sphere in space.

The 3D algorithm of intersecting a straight line and a sphere in space can be achieved through formula (4), formula (5), and formula (6).

Based on the middle position $V(x_0, y_0, z_0)$ and the first position $A1(x_1, y_1, z_1)$, a direction vector $\overrightarrow{A1V}(m, n, p)$ of the straight line connecting the first position $A1(x_1, y_1, z_1)$ and the middle position $V(x_0, y_0, z_0)$ is determined through the following formula (4), $$\frac{x-x_0}{m} = \frac{y-y_0}{n} = \frac{z-z_0}{p} = t, \qquad (4)$$

where t is a fixed value.

Based on the first position $A1(x_1, y_1, z_1)$ and the second position $B1(x_2, y_2, z_2)$ on the straight line, a direction vector $\overrightarrow{A1B1}$ having the first position $A1(x_1, y_1, z_1)$ as a starting point and the second position $B1(x_2, y_2, z_2)$ as an end point is determined, and any point P(x, y, z) on the straight line in space can be obtained through the following formula (5), $$P=A1+t\times\overrightarrow{A1B1}. \qquad (5)$$

The middle position $V(x_0, y_0, z_0)$ is determined as the position of a center of the sphere, and r is assumed to a radius of the sphere, a spherical surface can be obtained through the following formula (6), $$r=d/2, (x-x_0)^2+(y-y_0)^2+(z-z_0)^2=r^2. \qquad (6)$$

Formula (4), formula (5), and formula (6) are simultaneously combined to obtain the first end point position $A2(x_3, y_3, z_3)$ of the first virtual object and the second end position $B2(x_4, y_4, z_4)$ of the second virtual object.

Figure 7:
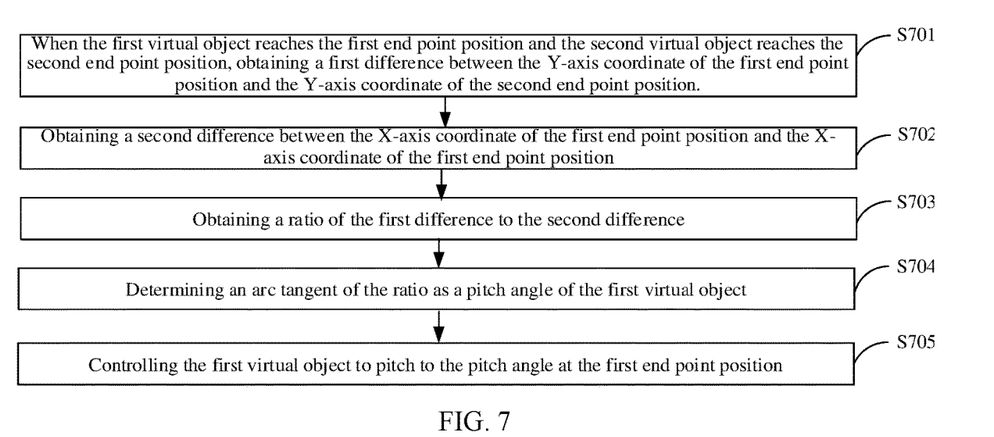
FIG. 7 is a flowchart of another exemplary information processing method according to some embodiments of the present disclosure.

In some embodiments, as shown in FIG. 7, in the world coordinate system, if the Y-axis coordinate of the first position is not equal to the Y-axis coordinate of the second position, the following processes may also be performed.

At S701, when the first virtual object reaches the first end point position and the second virtual object reaches the second end point position, a first difference between the Y-axis coordinate of the first end point position and the Y-axis coordinate of the second end point position is obtained.

At S702, a second difference between the X-axis coordinate of the first end point position and the X-axis coordinate of the first end point position is obtained.

At S703, a ratio of the first difference to the second difference is obtained.

At S704, an arc tangent of the ratio is determined as a pitch angle of the first virtual object.

At S705, the first virtual object is controlled to pitch to the pitch angle at the first end point position.

Figure 8:
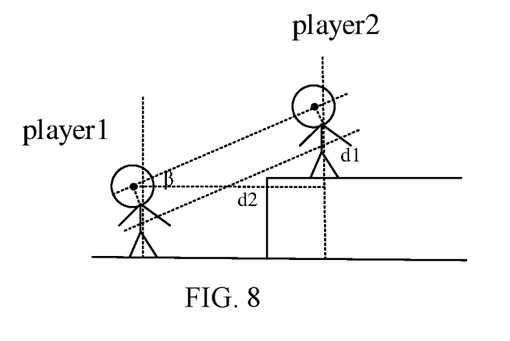
FIG. 8 is a schematic diagram of the first virtual object and the second virtual object when not being located at a same height on a Y-axis according to some embodiments of the present disclosure.

FIG. 8 is a schematic diagram of the first virtual object and the second virtual object when not being located at a same height on a Y axis according to some embodiments of the present disclosure. As shown in FIG. 8, when the first virtual object player1 reaches the first end point position, and the second virtual object player2 reaches the second end point position, the electronic device obtains a first difference d1 between the Y-axis coordinate of the first end point position and the Y-axis coordinate of the second end point position, and obtains a second difference d2 between the X-axis coordinate of the first end point position and the X-axis coordinate of the first end point position. The electronic device calculates a ratio d1/d2 of the first difference to the second difference. an arc tangent of the ratio d1/d2 is determined as a pitch angle β of the first virtual object player1, that is, $\beta=\tan^{-1} d1/d2$. The electronic device controls the first virtual object player1 to pitch to the pitch angle β at the first end point position. As such, when the first virtual object and the second virtual object are not at a same height on the Y-axis, the line of sight does not intersect when performing the interactive action, and there is a problem of height difference in the interactive action, the intersection of the line of sight can be achieved when the first virtual object and the second virtual object perform the interactive action, and the interactive action can be performed at the same height, thereby improving the player's gaming experience.

Referring back to FIG. 4, at S406, during the process of the first virtual object moving from the first position along the moving direction, a third screen of the application program is displayed.

The third frame is an image of observing the first virtual object through the image acquisition model during the process of the first virtual object moving along the moving direction.

In some embodiments, during the process of moving the first virtual object from the first position along the moving direction, because the display screen is updated and displayed in the form of image frames, during the process of the first virtual object moving, a third image when the first virtual object is observed through the image acquisition model is obtained at regular intervals, such that the image frame of the first virtual object during its movement is updated.

In some embodiments, the third screen is an image of observing the first virtual object at a specific position through the image acquisition model during the process of the first virtual object moving in a straight line at a constant speed along the moving direction. The specific position is a position at regular intervals corresponding to a preset movement duration when the first virtual object moves in the straight line at the constant speed.

Figure 9:
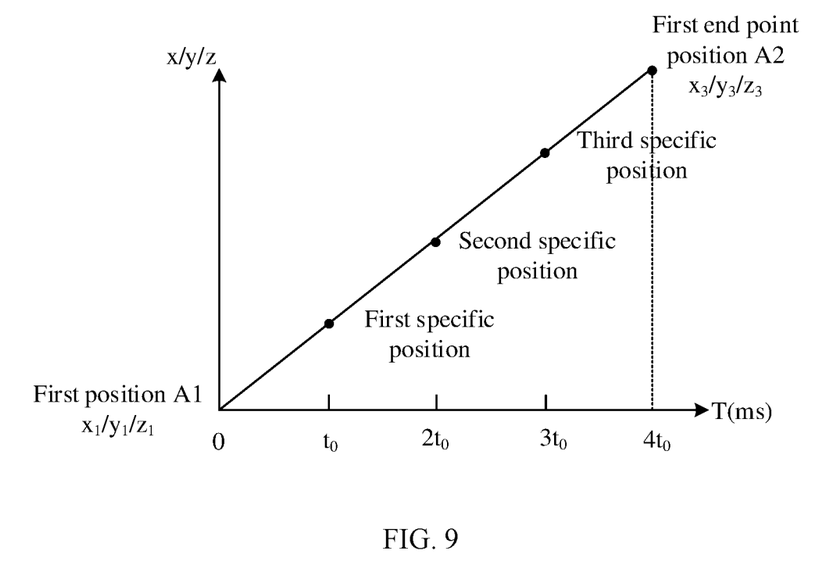
FIG. 9 is a schematic diagram of the first virtual object moving past a plurality of positions according to some embodiments of the present disclosure.

FIG. 9 is a schematic diagram of the first virtual object moving past a plurality of positions according to some embodiments of the present disclosure. The electronic device performs a linear interpolation process according to time intervals to calculate a plurality of specific positions of the first virtual object during its movement. That is, when the current first position $A1(x_1, y_1, z_1)$ and the first end point position $A2(x_3, y_3, z_3)$ of the first virtual object are determined, the preset movement duration $t_0$ is obtained. When the electronic device determines that the first virtual object moves in the straight line at the constant speed, the regular intervals corresponding to each preset movement duration $t_0$ correspond to the plurality of specific positions. Further, when the electronic device controls the first virtual object to move in the straight line at the constant speed along the moving direction, the image acquisition model observes the first virtual object at the plurality of specific positions to obtain a plurality of third images. Further, the target rotation matrix R, a translation matrix T, and a scaling matrix S of the first virtual object are obtained. A change matrix M of the first virtual objects in different third images is obtained. The first virtual object moves in the virtual environment based on the change matrix M. As such, the image at the position where the first virtual object is located can be updated and rendered. The translation matrix T and the scaling matrix S are as follows, $$T = \begin{vmatrix} 1 & 0 & 0 & T_x \\ 0 & 1 & 0 & T_y \\ 0 & 0 & 1 & T_z \\ 0 & 0 & 0 & 1 \end{vmatrix}, S = \begin{vmatrix} S_x & 0 & 0 & 0 \\ 0 & S_y & 0 & 0 \\ 0 & 0 & S_z & 0 \\ 0 & 0 & 0 & 1 \end{vmatrix}.$$

The change matrix M may be obtained through the following formula (7), $$M = R \times T \times S. \tag{7}$$

Referring back to FIG. 4, at S407, the first virtual object is controlled to perform the interactive action with the second virtual object, and a second screen of the application program is displayed.

The second screen is an image of observing the interactive action between the first virtual object and the second virtual object through the image acquisition model.

It should be noted that, for descriptions of the same processes and content in this embodiment as in other embodiments, reference may be made to the descriptions in the other embodiments, and details thereof are omitted herein.

Figure 10:
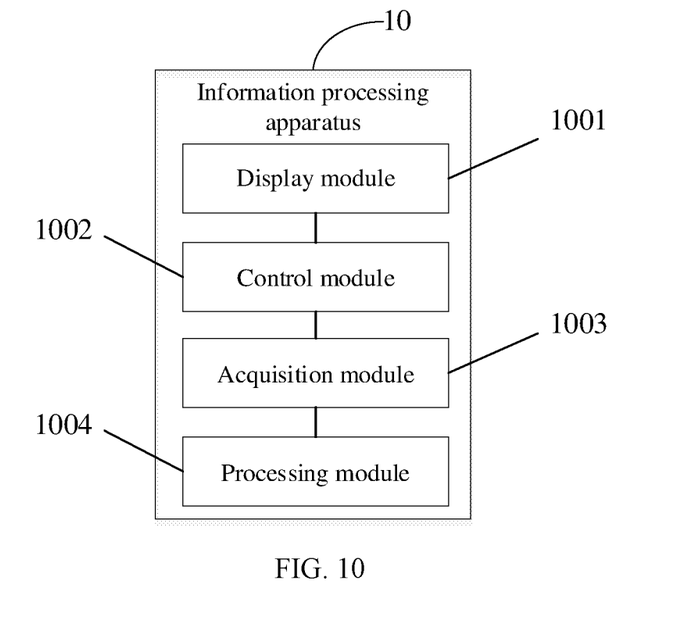
FIG. 10 is a schematic structural diagram of an exemplary information processing apparatus according to some embodiments of the present disclosure.

The present disclosure also provides an information processing apparatus. The information processing apparatus can be used to implement the information processing method provided in the embodiments corresponding to FIG. 1, FIG. 4, FIG. 5, and FIG. 7. FIG. 10 is a schematic structural diagram of an exemplary information processing apparatus according to some embodiments of the present disclosure. As shown in FIG. 10, the information processing apparatus 10 includes: a display module 1001 configured to display the first screen of the application program, where the first screen includes the image of observing the first virtual object through the image acquisition model in the virtual environment, and a control module 1002 configured to respond to the operation of initiating the interactive action on the first virtual object, control the first virtual object to initiate the interactive action, and determine the second virtual object in the virtual environment whose feature satisfies the feature locking condition.

The control module 1002 is further configured to control the first virtual object to perform interactive action with the second virtual object.

The display module 1001 is further configured to display the second screen of the application program, where the second screen is the image of observing the interactive action between the first virtual object and the second virtual object through the image acquisition model.

In some embodiments, the feature of the virtual object satisfying the feature locking condition includes: the similarity between the interactive action initiated by the virtual object in the virtual environment and the interactive action initiated by the first virtual object is greater than the similarity threshold.

In some embodiments, the feature of the virtual object satisfying the feature locking condition also includes at least one of the following: the distance between the position of the virtual object and the position of the first virtual object is less than the distance threshold; the angle formed between the face orientation of the virtual object and the face orientation of the first virtual object is less than the preset angle; or the interval between the virtual object initiating the interactive action and the first virtual object initiating the interactive action is less than the interval threshold.

In some embodiments, the information processing apparatus further includes an acquisition module 1003 and a processing module 1004. The acquisition module 1003 is configured to obtain the first position and the face orientation of the first virtual object and the second position and the face orientation of the second virtual object in the world coordinate system. The processing module 1004 is configured to determine the moving direction when the first virtual object moves to the second virtual object based on the first position, the face orientation, and the second position. The control module 1002 is further configured to control the first virtual object to move from the first position along the moving direction.

In some embodiments, the processing module 1004 is further configured to predict the first end point position based on the first position, the moving direction, and the second position. The control module 1002 is further configured to control the first virtual object to moves from the first position to the first end point position along the moving direction.

In some embodiments, the acquisition module 1003 is further configured to obtain the first difference between the Y-axis coordinate of the first end point position and the Y-axis coordinate of the second end point position when the first virtual object reaches the first end point position and the second virtual object reaches the second end point position; obtain the second difference between the X-axis coordinate of the first end point position and the X-axis coordinate of the second end point position; and obtain the ratio of the first difference to the second difference. The module 1004 is further configured to determine the arc tangent of the ratio as the pitch angle of the first virtual object. The control module 1002 is further configured to control the first virtual object to pitch to the pitch angle at the first end point position.

In some embodiments, the display module 1001 is further configured to display the third screen of the application program during the movement of the first virtual object, where the third screen is an image of observing the first virtual object through the image acquisition model during the movement of the first virtual object along the moving direction.

In some embodiments, the third screen is an image of observing the first virtual object at the specific position through the image acquisition model during the process of the first virtual object moving in the straight line at the constant speed along the moving direction, and the specific position is the position at the intervals corresponding to the preset movement duration in the process of the first virtual object moving in the straight line at the constant speed.

Based on the foregoing embodiments, the present disclosure also provide an electronic device. The electronic device includes but is not limited to mobile terminal devices such as a mobile phone, a tablet computer, a notebook computer, a personal digital assistant (PDA), a wearable device, and a vehicle-mounted device, as well as fixed terminals such as a desktop computer.

In the following, the application of the information processing method to the interaction between a wearable device and an electronic device is illustrated as an example.

Figure 11:
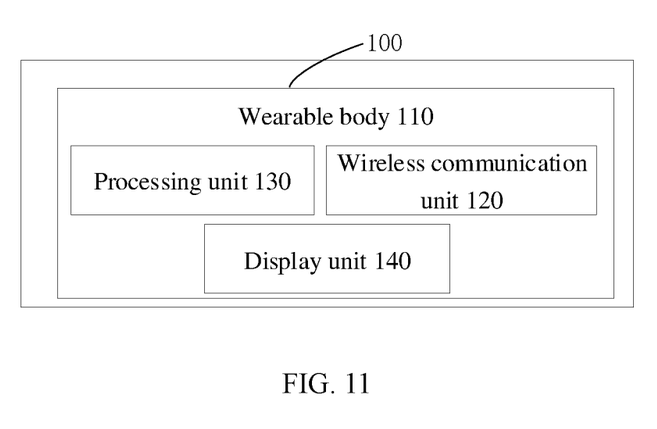
FIG. 11 is a schematic structural diagram of an exemplary wearable device according to some embodiments of the present disclosure.

FIG. 11 is a schematic structural diagram of an exemplary wearable device according to some embodiments of the present disclosure. As shown in FIG. 11, the wearable device 100 includes a wearable body 110 and a wearing component (not shown). The wearable body 110 includes a wireless communication unit 120, a processing unit 130, and a display unit 140.

The wireless communication unit 120 is connected to the electronic device and is at least configured to receive a display image (or a display screen) sent by the electronic device, and to feed back an instruction operation to the electronic device, such that the electronic device obtains an interactive action that has a mapping relationship with the instruction operation according to the received instruction operation, and responds to the instruction operation that initiates the interactive action on virtual objects. Before the electronic device sends the display screen to the wearable device 100, the wearable device 100 establishes a connection with the electronic device through near field communication of the wireless communication unit 120. The near field communication includes but is not limited to Wi-Fi communication, Bluetooth (BT) communication, near field communication technology (NFC), and other near field communication technologies.

The processing unit 130 is disposed on the wearable body 110. The processing unit 130 may be a processor configured to execute the processes of an information processing method provided in the embodiments of the present disclosure.

The processing unit 130 may include but is not limited to one or more of a central processing unit (CPU), a microprocessor (MPU), a digital signal processor (DSP), and a field programmable gate array (FPGA). The display unit 140 is configured to display the display screen sent by the electronic device, such that the wearable device feeds back the instruction operation to the electronic device according to the display screen.

In practical applications, the wearable body 110 may include but is not limited to an enclosure of the wearable device and peripheral hardware circuits necessary for supporting the normal operation of the wireless communication unit 120 and the processing unit 130.

Figure 12:
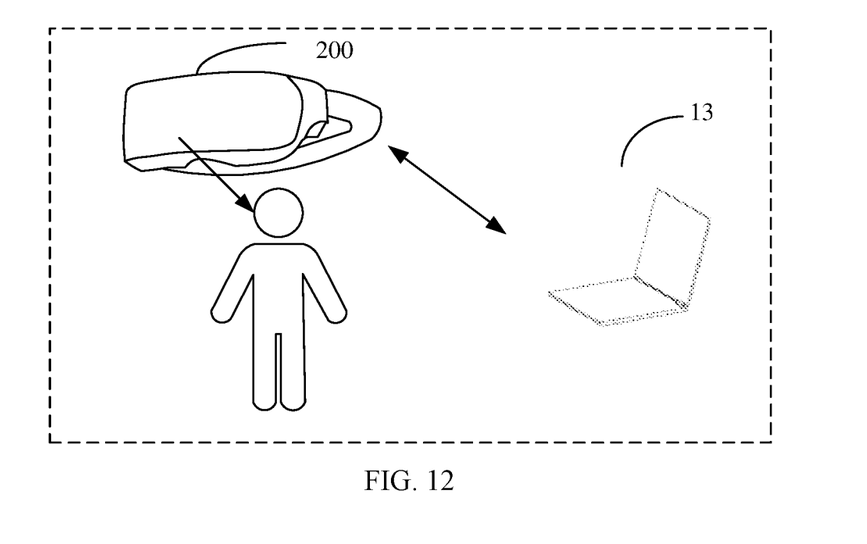
FIG. 12 is a schematic diagram of interaction between a wearable AR device and an electronic device according to some embodiments of the present disclosure.

In an application scenario, the wearable device is a wearable augmented reality (AR) device. As shown in FIG. 12, the wearable AR device 200 includes the wearable body and the wearing component (e.g., headband). The wearable body includes the wireless communication unit, the processing unit, and the display unit. The wearable AR device 200 receives the first screen sent by the electronic device 13. The first screen includes the image of observing the first virtual object through the image acquisition model in the virtual environment. The wearable AR device 200 sends the instruction operation to the electronic device 13 in response to the instruction operation on the wearable AR device 200. The instruction operation includes but is not limited to operations such as nodding, shaking the head, and turning of the user. The electronic device 13 obtains the interactive action corresponding to the instruction operation according to the instruction operation, responds to the instruction operation of initiating the interactive action of the first virtual object, controls the first virtual object to initiate the interactive action, and determines the second virtual object whose feature in the virtual environment satisfies the feature locking condition. Then, the electronic device 13 controls the first virtual object to perform the interactive action on the second virtual object, and sends the second screen of the application program to the wearable AR device 200. The wearable AR device 200 displays the second screen. The second screen is the image of observing the interactive action between the first virtual object and the second virtual object through the image acquisition model. As such, through the interaction between the wearable device and the electronic device, the two virtual objects in the application program are automatically locked. After the two virtual objects complete the interactive action, the two virtual objects are automatically unlocked. Thus, the intelligence of the device is improved, and the user experience is improved.

Figure 13:
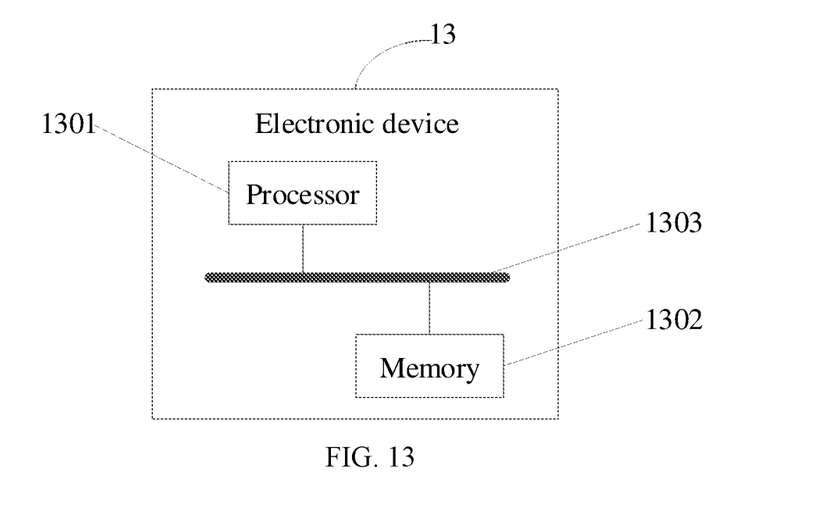
FIG. 13 is a schematic structural diagram of an exemplary electronic device according to some embodiments of the present disclosure.

Based on the foregoing embodiments, the electronic device may be used for the information processing method provided in the embodiments corresponding to FIG. 1, FIG. 4, FIG. 5, and FIG. 7. FIG. 13 is a schematic structural diagram of an exemplary electronic device according to some embodiments of the present disclosure. As shown in FIG. 13, the electronic device 13 (the electronic device 13 in FIG. 13 corresponds to the information processing device 10 in FIG. 10) includes: a processor 1301, a memory 1302, and a communication bus 1303. The communication bus 1303 is configured to realize the communication connection between the processor 1301 and the memory 1302. The processor 1301 is configured to execute an information processing program stored in the memory 1302 to realize the following processes. The first screen of the application program is displayed. The first screen includes the image of observing the first virtual object through the image acquisition model in the virtual environment. The operation of initiating the interactive action on the first virtual object is responded. The first virtual object is controlled to initiate the interactive action. The second virtual object in the virtual environment whose feature satisfies the feature locking condition is determined. The first virtual object is controlled to perform the interactive action with the second virtual object. The second screen of the application program is displayed. The second screen is the image of observing the interactive action between the first virtual object and the second virtual object through the image acquisition model.

In some embodiments, the feature of the virtual object satisfying the feature locking condition includes: the similarity between the interactive action initiated by the virtual object and the interactive action initiated by the first virtual object in the virtual environment is greater than the similarity threshold.

In some embodiments, the feature of the virtual object satisfying the feature locking condition also includes at least one of the following: the distance between the position of the virtual object and the position of the first virtual object is less than the distance threshold; the angle formed between the face orientation of the virtual object and the face orientation of the first virtual object is less than the preset angle; or the interval between the virtual object initiating the interactive action and the first virtual object initiating the interactive action is less than the interval threshold.

In some embodiments, the processor 1301 is configured to execute the information processing program stored in the memory 1302 to realize the following processes. The first position and face orientation of the first virtual object, and the second position of the second virtual object in the world coordinate system are obtained. Based on the first position, the face orientation, and the second position, the moving direction that the first virtual object moves to the second virtual object is determined. The first virtual object is controlled to move from the first position along the moving direction.

In some embodiments, the processor 1301 is further configured to execute the information processing program stored in the memory 1302 to realize the following processes. The first end point position is predicted based on the first position, the moving direction, and the second position. The first virtual object is controlled to move from the first position along the moving direction to the first end point position.

In some embodiments, the processor 1301 is further configured to execute the information processing program stored in the memory 1302 to realize the following processes. When the first virtual object reaches the first end point position and the second virtual object reaches the second end point position, the first difference between the Y-axis coordinate of the first end point position and the Y-axis coordinate of the second end point position is obtained. The second difference between the X-axis coordinate of the first end point position and the X-axis coordinate of the second end point position is obtained. The ratio of the first difference to the second difference is obtained. The arc tangent of the ratio is determined as the pitch angle of the first virtual object. The first virtual object is controlled to pitch to the pitch angle at the first end point position.

In some embodiments, the processor 1301 is further configured to execute the information processing program stored in the memory 1302 to realize the following processes. During the movement of the first virtual object, the third screen of the application program is displayed. The third screen is the image of observing the first virtual object through the image acquisition model during the process of the first virtual object moving along the moving direction.

In some embodiments, the third screen is the image of observing the first virtual object at the specific position through the image acquisition model during the process of the first virtual object moving in the straight line at the constant speed along the moving direction, and the specific position is the position at the regular intervals corresponding to the preset moving duration during the process of the first virtual object moving in the straight line at the constant speed.

The present disclosure also provides a computer-readable storage medium. The computer-readable storage medium stores one or more programs. The one or more programs may be executed by one or more processors to perform the following processes. The first screen of the application program is displayed. The first screen is the image of observing the first virtual object through the image acquisition model in the virtual environment. In response to the operation of initiating the interactive action on the first virtual object, the first virtual object is controlled to initiate then interactive action to determine the second virtual object whose feature satisfies the feature locking condition. The first virtual object is controlled to perform the interactive action with the second virtual object. The second screen of the application program is displayed. The second screen is the image of observing the interactive action between the first virtual object and the second virtual object through the image acquisition model. That is, in some embodiments, the electronic device determines the virtual object in the virtual environment whose feature satisfies the feature locking condition as the second virtual object based on at least the interactive action initiated by the first virtual object, to automatically lock the first virtual object and the second virtual object. The first virtual object is controlled to perform the interactive action with the second virtual object. The second screen is displayed. The second screen is the image of observing the interactive action between the first virtual object and the second virtual object through the image acquisition model. As such, the following problem of dislocation can be solved. One virtual object and the other virtual object need to be located at the specific position. Only after the one virtual object sends out interactive action invitation, and the other virtual object accepts the interactive action invitation, the two virtual objects are able to perform the interactive action, and the two virtual objects are automatically locked. After the two virtual objects complete the interactive action, the two virtual objects are automatically unlocked. Thus, the intelligence of the device is improved and the user experience is improved.

Those skilled in the art should understand that the embodiments of the present disclosure may be provided as methods, systems, or computer program products. Accordingly, the present disclosure may take the form of a hardware embodiment, a software embodiment, or an embodiment combining software and hardware aspects. Further, the present disclosure may take the form of a computer program product embodied on one or more computer-readable storage media (including but not limited to a magnetic disk and an optical disk, etc.) having computer-readable program code embodied therein.

The present disclosure is described with reference to flowcharts and/or block diagrams of methods, devices (systems), and computer program products according to embodiments of the present disclosure. It should be understood that each procedure and/or block in the flowchart and/or block diagram, and a combination of procedures and/or blocks in the flowchart and/or block diagram can be realized by computer program instructions. The computer program instructions may be provided to a general-purpose computer, a special-purpose computer, an embedded processor, or a processor of other programmable data processing equipment to produce a machine such that the program instructions executed by the processor of the computer or other programmable data processing equipment produce an apparatus for realizing the functions specified in one or more processes of the flowchart and/or one or more blocks of the block diagram.

These computer program instructions may also be stored in a computer-readable memory capable of directing a computer or other programmable data processing apparatus to operate in a specific manner, such that the computer program instructions stored in the computer-readable memory produce an article of manufacture comprising instruction means, the instructions. The device realizes the function specified in one or more processes of the flowchart and/or one or more blocks of the block diagram.

The computer program instructions can also be loaded onto a computer or other programmable data processing device, causing a series of operational steps to be performed on the computer or other programmable device to produce a computer-implemented process, thereby implementing the functions specified in the flow chart or blocks of the flowchart and/or the block or blocks of the block diagrams.

The above description of the disclosed embodiments enables those skilled in the art to implement or use the present disclosure. Various modifications to the embodiments will be obvious to those skilled in the art, and the general principles defined herein can be implemented in other embodiments without departing from the spirit or scope of the present disclosure. Therefore, this application will not be limited to the embodiments shown in the specification, but should conform to the broadest scope consistent with the principles and novelties disclosed in the specification.

What is claimed is:

1. An information processing method, comprising:
    displaying a first screen of an application program, the first screen being an image of observing a first virtual object in a virtual environment through an image acquisition model;
    in response to an operation of initiating an interactive action of the first virtual object, controlling the first virtual object to initiate the interactive action, and determining a second virtual object in the virtual environment whose feature satisfies a feature locking condition;
    controlling the first virtual object to perform the interactive action with the second virtual object, and displaying a second screen of the application program, the second screen being an image of observing the interactive action between the first virtual object and the second virtual object through the image acquisition model;
    controlling the first virtual object to move toward the second virtual object to a first end point position;
    obtaining a first difference between a Y-axis coordinate of the first end point position and a Y-axis coordinate of a second end point position when the first virtual object reaches the first end point position and the second virtual object reaches the second end point position, the first difference corresponding to a height difference between the first virtual object and the second virtual object;
    determining a pitch angle of the first virtual object based on the first difference; and
    controlling the first virtual object to pitch to the pitch angle at the first end point position.

2. The information processing method according to claim 1, wherein the feature of the second virtual object is determined as satisfying the feature locking condition based on
    a similarity between an interactive action initiated by the second virtual object and the interactive action initiated by the first virtual object in the virtual environment being greater than a similarity threshold.

3. The information processing method according to claim 2, wherein the feature of the second virtual object is determined as satisfying the feature locking condition further based on at least one of:
    a distance between a position of the second virtual object and a position of the first virtual object being less than a distance threshold;
    an angle formed between face orientation of the second virtual object and face orientation of the first virtual object being less than a preset angle; or
    an interval between the second virtual object initiating the interactive action and the first virtual object initiating the interactive action being less than an interval threshold.

4. The information processing method according to claim 1, further comprising after controlling the first virtual object to initiate the interactive action, and determining the second virtual object in the virtual environment whose feature satisfies the feature locking condition:
    obtaining a first position and the face orientation of the first virtual object, and a second position of the second virtual object in a world coordinate system;
    determining a moving direction that the first virtual object moves to the second virtual object based on the first position, the face orientation, and the second position; and
    controlling the first virtual object to move from the first position along the moving direction.

5. The information processing method according to claim 4, wherein controlling the first virtual object to move from the first position along the moving direction includes:
    predicting the first end point position based on the first position, the moving direction, and the second position; and
    controlling the first virtual object to move from the first position to the first end point position along the moving direction.

6. The information processing method according to claim 5, further comprising under a circumstance that a Y-axis coordinate of the first position and a Y-axis coordinate of the second position are different:
    obtaining a second difference between an X-axis coordinate of the first end point position and an X-axis coordinate of the second end point position;
    obtaining a ratio of the first difference to the second difference; and
    determining an arc tangent of the ratio as the pitch angle of the first virtual object.

7. The information processing method according to claim 4, further comprising:
    displaying a third screen of the application program during a movement of the first virtual object, wherein the third screen is an image of observing the first virtual object through the image acquisition model during a process of the first virtual object moving along the moving direction.

8. The information processing method according to claim 7, wherein:
the third screen is an image of observing the first virtual object at a specific position through the image acquisition model during the process of the first virtual object moving in a straight line at a constant speed along the moving direction, and the specific position is a position at regular intervals corresponding to a preset movement duration in the process of the first virtual object moving in the straight line at the constant speed.

9. An information processing apparatus, comprising:
a memory storing program instructions; and
a processor coupled to the memory;
wherein when being executed by the processor, the program instructions cause the processor to:
display a first screen of an application program, the first screen being an image of observing a first virtual object in a virtual environment through an image acquisition model;
in response to an operation of initiating an interactive action of the first virtual object, control the first virtual object to initiate the interactive action, and determining a second virtual object in the virtual environment whose feature satisfies a feature locking condition;
control the first virtual object to perform the interactive action with the second virtual object, and displaying a second screen of the application program, the second screen being an image of observing the interactive action between the first virtual object and the second virtual object through the image acquisition model;
control the first virtual object to move toward the second virtual object to a first end point position;
obtain a first difference between a Y-axis coordinate of the first end point position and a Y-axis coordinate of a second end point position when the first virtual object reaches the first end point position and the second virtual object reaches the second end point position, the first difference corresponding to a height difference between the first virtual object and the second virtual object;
determine a pitch angle of the first virtual object based on the first difference; and
control the first virtual object to pitch to the pitch angle at the first end point position.

10. The information processing apparatus according to claim 9, wherein the feature of the second virtual object is determined as satisfying the feature locking condition based on
a similarity between an interactive action initiated by the second virtual object and the interactive action initiated by the first virtual object in the virtual environment being greater than a similarity threshold.

11. The information processing apparatus according to claim 10, wherein the feature of the second virtual object is determined as satisfying the feature locking condition further based on at least one of:
a distance between a position of the second virtual object and a position of the first virtual object being less than a distance threshold;
an angle formed between face orientation of the second virtual object and face orientation of the first virtual object being less than a preset angle; or
an interval between the second virtual object initiating the interactive action and the first virtual object initiating the interactive action being less than an interval threshold.

12. The information processing apparatus according to claim 9, wherein after controlling the first virtual object to initiate the interactive action, and determining the second virtual object in the virtual environment whose feature satisfies the feature locking condition, the processor is further configured to:
obtain a first position and the face orientation of the first virtual object, and a second position of the second virtual object in a world coordinate system;
determine a moving direction that the first virtual object moves to the second virtual object based on the first position, the face orientation, and the second position; and
control the first virtual object to move from the first position along the moving direction.

13. The information processing apparatus according to claim 12, wherein when controlling the first virtual object to move from the first position along the moving direction, the processor is further configured to:
predict the first end point position based on the first position, the moving direction, and the second position; and
control the first virtual object to move from the first position to the first end point position along the moving direction.

14. The information processing apparatus according to claim 13, wherein under a circumstance that a Y-axis coordinate of the first position and a Y-axis coordinate of the second position are different, the processor is further configured to:
obtain a second difference between an X-axis coordinate of the first end point position and an X-axis coordinate of the second end point position;
obtain a ratio of the first difference to the second difference; and
determine an arc tangent of the ratio as the pitch angle of the first virtual object.

15. The information processing apparatus according to claim 12, wherein the processor is further configured to:
display a third screen of the application program during a movement of the first virtual object, wherein the third screen is an image of observing the first virtual object through the image acquisition model during a process of the first virtual object moving along the moving direction.

16. The information processing apparatus according to claim 15, wherein:
the third screen is an image of observing the first virtual object at a specific position through the image acquisition model during the process of the first virtual object moving in a straight line at a constant speed along the moving direction, and the specific position is a position at regular intervals corresponding to a preset movement duration in the process of the first virtual object moving in the straight line at the constant speed.

17. A non-transitory computer-readable storage medium storing program instructions, when being executed by a processor, the program instructions causing the processor to:
display a first screen of an application program, the first screen being an image of observing a first virtual object in a virtual environment through an image acquisition model;

in response to an operation of initiating an interactive action of the first virtual object, control the first virtual object to initiate the interactive action, and determining a second virtual object in the virtual environment whose feature satisfies a feature locking condition;

control the first virtual object to perform the interactive action with the second virtual object, and displaying a second screen of the application program, the second screen being an image of observing the interactive action between the first virtual object and the second virtual object through the image acquisition model;

control the first virtual object to move toward the second virtual object to a first end point position;

obtain a first difference between a Y-axis coordinate of the first end point position and a Y-axis coordinate of a second end point position when the first virtual object reaches the first end point position and the second virtual object reaches the second end point position, the first difference corresponding to a height difference between the first virtual object and the second virtual object;

determine a pitch angle of the first virtual object based on the first difference; and control the first virtual object to pitch to the pitch angle at the first end point position.

18. The non-transitory computer-readable storage medium according to claim 17, wherein the feature of the second virtual object is determined as satisfying the feature locking condition based on a similarity between an interactive action initiated by the second virtual object and the interactive action initiated by the first virtual object in the virtual environment being greater than a similarity threshold.

19. The non-transitory computer-readable storage medium according to claim 18, wherein the feature of the second virtual object is determined as satisfying the feature locking condition further based on at least one of:

a distance between a position of the second virtual object and a position of the first virtual object being less than a distance threshold;

an angle formed between face orientation of the second virtual object and face orientation of the first virtual object being less than a preset angle; or an interval between the second virtual object initiating the interactive action and the first virtual object initiating the interactive action being less than an interval threshold.

20. The non-transitory computer-readable storage medium according to claim 17, wherein after controlling the first virtual object to initiate the interactive action, and determining the second virtual object in the virtual environment whose feature satisfies the feature locking condition, the processor is further configured to:

obtain a first position and the face orientation of the first virtual object, and a second position of the second virtual object in a world coordinate system;

based on the first position, the face orientation, and the second position, determine a moving direction that the first virtual object moves to the second virtual object; and control the first virtual object to move from the first position along the moving direction.

* * * * *